(12) United States Patent
Danforth, III et al.

(10) Patent No.: US 11,368,100 B2
(45) Date of Patent: Jun. 21, 2022

(54) GENERATOR AND BATTERY BACKUP WITH CONVERSION DEVICE

(71) Applicant: Kohler Co., Kohler, WI (US)

(72) Inventors: Robert J. Danforth, III, Sheboygan Falls, WI (US); Adam Larson, Mequon, WI (US); Isaac S. Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 407 days.

(21) Appl. No.: 15/649,076

(22) Filed: Jul. 13, 2017

(65) Prior Publication Data

US 2019/0020284 A1 Jan. 17, 2019

(51) Int. Cl.
*H02M 5/458* (2006.01)
*H02J 9/08* (2006.01)
*H02J 9/06* (2006.01)
*H02J 7/02* (2016.01)
*H02M 5/293* (2006.01)
*H02M 7/797* (2006.01)

(52) U.S. Cl.
CPC .......... *H02M 5/4585* (2013.01); *H02J 7/022* (2013.01); *H02J 9/061* (2013.01); *H02J 9/08* (2013.01); *H02M 5/293* (2013.01); *H02M 7/797* (2013.01)

(58) Field of Classification Search
CPC .... H02M 5/4585; H02M 5/293; H02M 7/797; H02J 7/022; H02J 9/061; H02J 9/08
USPC ............................................. 307/66, 64, 26
See application file for complete search history.

(56) References Cited

U.S. PATENT DOCUMENTS

| 4,460,834 | A | 7/1984 | Gottfried |
| 4,719,550 | A * | 1/1988 | Powell .................... H02M 5/44 363/37 |
| 5,070,251 | A | 12/1991 | Rhodes et al. |
| 5,563,802 | A | 10/1996 | Plahn et al. |
| 5,929,538 | A | 7/1999 | O'Sullivan et al. |
| 6,198,176 | B1 | 3/2001 | Gillette |
| 7,701,087 | B2 | 4/2010 | Eckroad et al. |
| 9,543,761 | B2 | 1/2017 | Li et al. |
| 2002/0079741 | A1 | 6/2002 | Anderson |

(Continued)

FOREIGN PATENT DOCUMENTS

| CN | 204615504 U | 9/2015 |
| KR | 101376214 B1 | 3/2014 |

OTHER PUBLICATIONS

European Office Action for European Patent Application No. 18 181 642.2-1202 dated May 28, 2020.

(Continued)

*Primary Examiner* — Daniel Cavallari
*Assistant Examiner* — Swarna N Chowdhuri
(74) *Attorney, Agent, or Firm* — Lempia Summerfield Katz LLC

(57) ABSTRACT

An apparatus includes a controlled field alternator or utility source of electrical power, a conversion device, and a controller. The conversion device includes a first power input associated with a first power source, a second power input associated with a second power source, and circuitry configured to perform a first conversion of power from a first format from the first power source to a second format for charging the second power source and perform a second conversion of power from the second format for the second power source to a third format for supplying a load.

14 Claims, 14 Drawing Sheets

(56) References Cited

U.S. PATENT DOCUMENTS

| | | | | |
|---|---|---|---|---|
| 2003/0173828 A1* | 9/2003 | Bachinski | | H02J 9/08 307/66 |
| 2004/0084965 A1* | 5/2004 | Welches | | H02M 5/458 307/64 |
| 2005/0012395 A1 | 1/2005 | Eckroad et al. | | |
| 2008/0203820 A1* | 8/2008 | Kramer | | H02J 3/38 307/64 |
| 2009/0021080 A1 | 1/2009 | Loucks et al. | | |
| 2011/0215649 A1* | 9/2011 | Min | | H02J 1/00 307/72 |
| 2011/0291483 A1* | 12/2011 | Yamane | | H02J 9/06 307/65 |
| 2013/0076141 A1* | 3/2013 | Paulakonis | | H02J 7/345 307/66 |
| 2013/0169064 A1 | 7/2013 | Park et al. | | |
| 2013/0193761 A1* | 8/2013 | Colombi | | H02J 9/062 307/64 |
| 2013/0235628 A1* | 9/2013 | Dong | | H02M 7/797 363/47 |
| 2014/0097683 A1 | 4/2014 | Piyabongkarn et al. | | |
| 2014/0139022 A1* | 5/2014 | Bush | | H02J 9/062 307/31 |
| 2015/0008745 A1* | 1/2015 | Navarro | | H02J 9/062 307/64 |
| 2015/0028677 A1 | 1/2015 | Iwasaki et al. | | |
| 2015/0076916 A1* | 3/2015 | Cheng | | H02J 9/062 307/66 |
| 2015/0270743 A1 | 9/2015 | Orthlieb et al. | | |
| 2015/0270744 A1* | 9/2015 | Lacarnoy | | H02J 9/061 307/66 |
| 2015/0340864 A1* | 11/2015 | Compton | | H02J 9/062 307/66 |
| 2016/0190867 A1* | 6/2016 | Ginart | | H02J 7/0063 307/67 |
| 2017/0033594 A1 | 2/2017 | Rozman et al. | | |
| 2017/0133879 A1* | 5/2017 | Eckhardt | | H02J 13/00017 |

OTHER PUBLICATIONS

European Office Action for European Patent Application No. 18 181 642.2-1202 dated Dec. 12, 2019.

John G Tracy. "Working in Harmony: Generator and Ups Compatibility" Source: http://ecmweb.com/power-quality-archive/working-harmony-generator-and-ups-compatibility. Publication Date: Sep. 1, 2001. Date Accessed: Feb. 22, 2017.

European Search Report for corresponding Application No. 18181642.2-1202, dated Nov. 11, 2018.

* cited by examiner

US 11,368,100 B2

GENERATOR AND BATTERY BACKUP WITH CONVERSION DEVICE

FIELD

This disclosure relates to the field of power backup systems, and more specifically, a conversion circuit to transition power for a load circuit from a main power source to a backup power source.

BACKGROUND

A utility, or electric utility, is the source of electrical power through a distributed grid to residential loads and business loads. An engine-generator set, which may be referred to as a generator or a genset, may include an engine and an alternator or another device for generating electrical energy or power. A generator may serve as a backup for the utility, providing a temporary source of power to the load when the utility suffers from a temporary break in service.

An automatic transfer switch (ATS) disconnects the utility from the load after detecting an interruption in service. Once the load is safely off of the grid, the automatic transfer switch instructs the generator to start and subsequently transfers the output of the generator to the load.

However, generators require time to start running and be brought into service with the load after the break in service for the utility. This delay may cause consumers and business to experience a short time with no power source. Challenges remain in efforts to reduce the break in service to achieve a power system that always provides power to the load even when transitioning from the main power source to the backup power source without significant losses to poor efficiency.

BRIEF DESCRIPTION OF THE DRAWINGS

Exemplary embodiments are described herein with reference to the following drawings.

DETAILED DESCRIPTION

Figure 1:
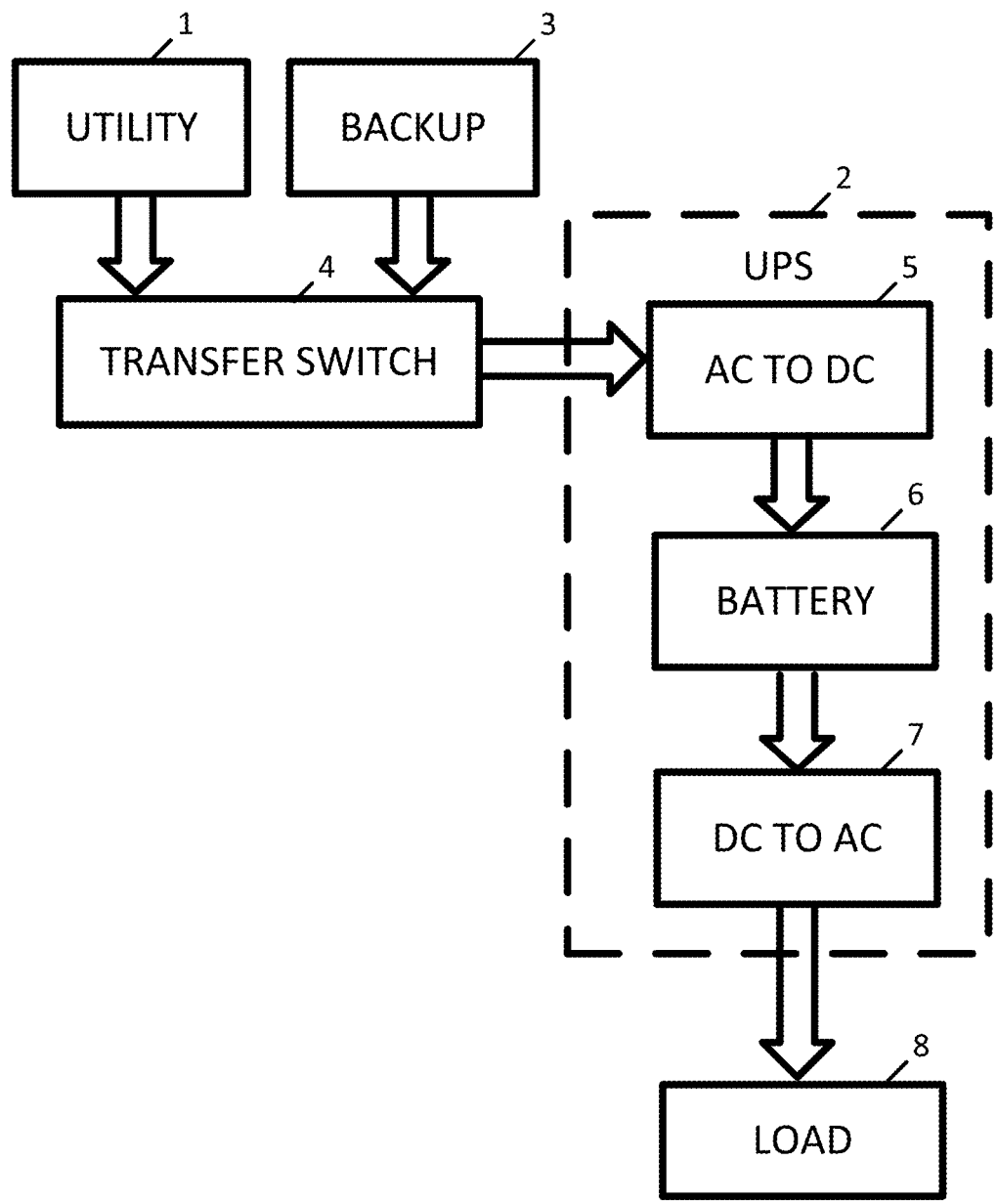
FIG. 1 illustrates an uninterruptible power supply system.

FIG. 1 illustrates a conventional system including a utility source 1, an uninterruptible power supply (UPS) 2, a backup source 3, a transfer switch 4, and a load 8. The UPS 2 may include an AC to DC converter 5, a battery 6, and a DC to AC converter 7. The transfer switch 4 selectively connects and disconnects the utility source 1 and the backup source 3 of power to the load 8. The transfer switch 4 may detect an interruption in service from the utility and switch the load to the backup source 3. However, because the interruption in service from the utility service is unexpected, the backup source 3 cannot be started until the break in utility service occurs. As a result, there is a delay before the backup source 3 of power is fully supplying power to the load 8. The delay may be equal to or proportional to the amount of time required for the backup source 3 of power to supply power to the load 8. The UPS 2 may be included in the system to provide a continuous source of power in order to avoid this delay. However, the UPS 2 introduces inefficiencies into the system.

To charge the battery 6, which is required for the UPS 2, the alternating current (AC) from either the utility source 1 or the backup source 3 is converted to direct current (DC) by the AC to DC converter 5. To power the load, which requires AC, the DC of the battery 6 is converted to AC at the DC to AC converter 7. Each conversion may include a loss of 1-10%, for a total of a 2-20% loss in efficiency when using the UPS 2. In many systems, these losses do not occur only when the utility source 1 experiences a failure. Instead, these losses occur at all times because all power flow must constantly flow through the UPS 2. In an example of a large annual load, the wasted electrical energy cost may reach hundreds of thousands of dollars. The following embodiments utilize a system that directly converts both the AC power of the generator to the amplitude and/or frequency required by the load circuit and the DC power of the battery to the amplitude and/or frequency required by the load circuit. In addition, the system may convert the AC power of the generator and/or the utility source to DC power to charge the battery.

The system may include a synchronous inverter or another type of bidirectional current converting device, which may be substituted for the synchronous inverter, which is configured to convert an input waveform to an output waveform, having a least one different electrical property. The changed electrical property may be voltage, frequency, or another property. The synchronous inverter may operate as any combination of an AC to AC converter, a DC to AC converter, or an AC to DC converter. The synchronous inverter may convert the input waveform to a lower frequency output signal by synthesizing segments of the input waveform without a direct current link. Current may flow through the synchronous inverter in both directions. In one direction, the synchronous inverter may convert AC to DC for charging a battery. In the other direction, the synchronous inverter may convert DC from the same battery to AC for supplying a load.

The synchronous inverter may include a network of transistors to similarly synthesize segments in a piecewise manner in order to generate the desired output waveform. Such a network of transistors is one example of a segmented waveform converter. The output of the segmented waveform converter may be a four-quadrant output as the segmented waveform converter can transfer both real power and reactive power in either direction through the segmented waveform converter. The segmented waveform converter generates the output waveform one segment at a time by directly passing a combination of one or more of the input signals. Appropriate filtering of the input waveform may be used to remove high-frequency ripple, switching noise, and undesirable distortion of the output. The output waveform is created from sequential piecewise sampling of the input voltage. The frequency of the sampling defines the length of the segments. The frequency of the sampling may be significantly higher than the frequency of the input waveform and the output waveform. For example, an input frequency of 200 Hz and an output frequency of 60 Hz may require a sampling and switching frequency of 20 kHz in order to provide acceptable output power quality.

Figure 2:
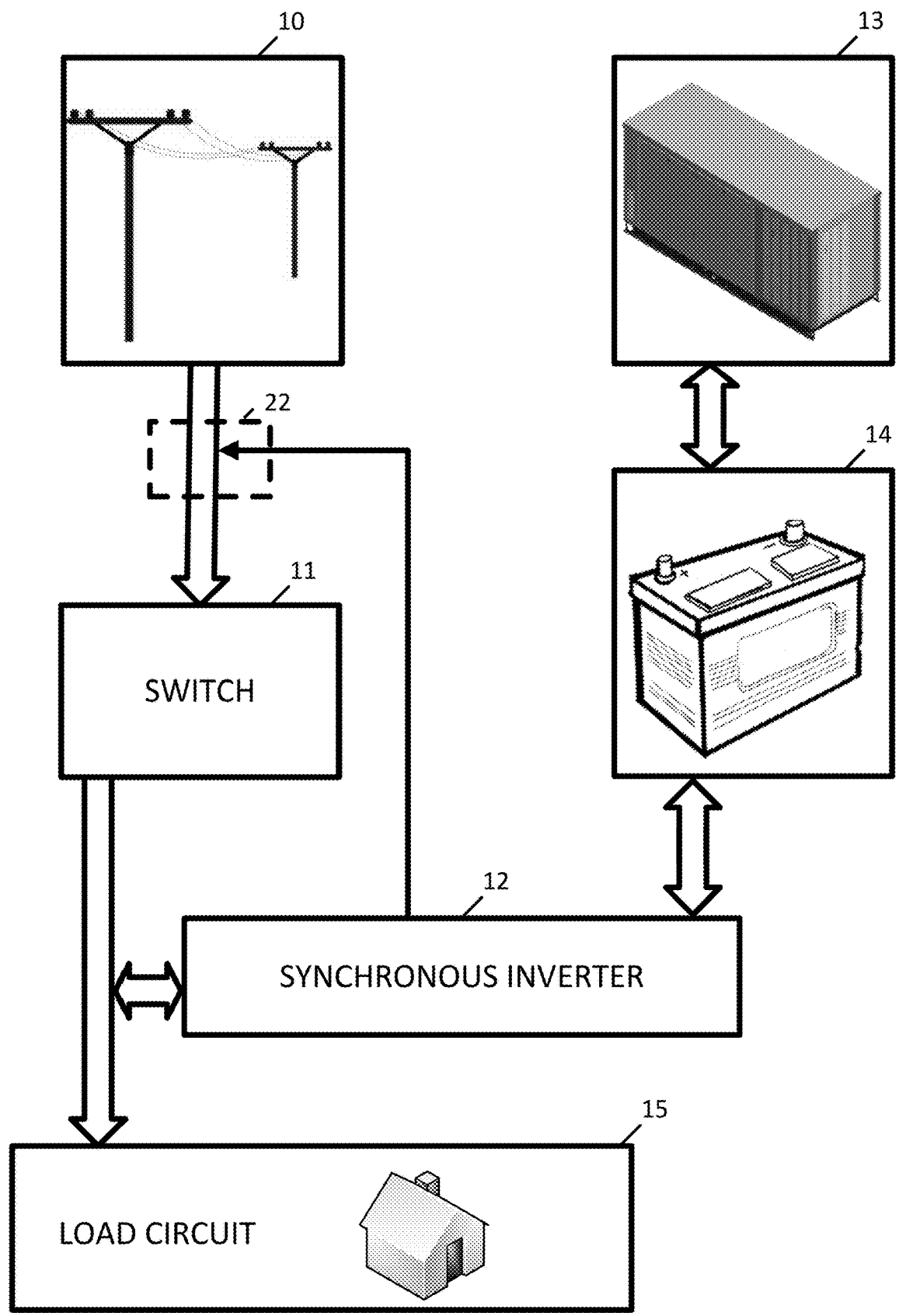
FIG. 2 illustrates an example generator and battery backup using a synchronous inverter.

FIG. 2 illustrates an example system including for power backup using a synchronous inverter. The system includes a utility source 10, a switch 11, a synchronous inverter 12, a generator 13, a battery 14, and a load circuit 15. Any aspects of this embodiment may be combined with other embodiments. Additional, different, or fewer components may be included.

The utility source 10 represents the utility or grid power. The utility source may include a utility circuit for bringing the electrical power of the utility to the load circuit 15. The utility circuit may include power lines, transmission lines, or distributions centers. The utility circuit may include an electric conductor that connects to the load circuit 15.

The load circuit 15 may include the circuits and equipment for a residence, a business, or an industrial site. The load circuit 15 may include one or more of a main line to the load, a meter, an electrical panel, and multiple subcircuits. The main line is the electrical conductor suspended or buried that connects the utility source 10 to the load circuit 15. The meter is a device that measures a quantity of power delivered from the utility source 10 to the load circuit 15. The electrical panel distributes the power from the main line to one or more subcircuits and includes a breaker for each of the one or more subcircuits. Each subcircuit may be associated with a different device (e.g., machine or appliance) or a different location (e.g., room or floor).

The battery 14 is a power source that also stores energy. The battery 14 may be referred to as an energy storage element. The battery 14 may include a network of batteries arranged in parallel or in series. The battery 14 may be charged by either the generator 13 or the utility source 10. In some scenarios, the battery 14 may provide power to the load circuit 15. Examples of other energy storage elements include flywheels, compressed gas, liquid moved to a higher elevation, a compressed spring, chemicals in a higher-energy state or a high-temperature mass. Energy storage elements that do not store electricity directly may be used to generate electricity and may therefore be used in lieu of the battery.

The generator 13 is a power source that includes at least an engine and an alternator. The engine converts stored fuel into a rotational force that drives the alternator. The engine may include components such as a manifold, a fuel tank, a fuel line, a starter, an air cleaning system, a muffler, a control portion, a governor system, a throttle system, a lubrication system, a user interface, and other components. The alternator may be a permanent magnet alternator or a controlled field alternator in which a field current is actively controlled by a generator controller (field current controller) to adjust the output of the alternator. The synchronous inverter controller and the field current controller may be the same device or different devices.

The controlled field alternator is configured to generate a signal through operation of the engine. The controlled field alternator may include an exciter armature for generating a field current. As the exciter armature is rotated in a magnetic flux, a time varying voltage is induced in the windings of the exciter armature. The output from the exciter armature is connected to the main field portion of generator. The connection may be made with or without brushes and slip rings. The field current of the output of the exciter provides a magnetic field in rotor field of the generator. As the field portion of the alternator is rotated relative to the stator, a magnetic flux is passed through and across the alternator stator windings producing time varying voltage. The field current from the exciter armature output may be rectified or otherwise controlled. The output of the alternator may be a three phase signal or a single phase signal.

A sensor 22 may include one or more sensors for determining an electrical parameter of the first power source or the connection between the first power source and the load circuit 15. The sensor 22 may include a voltage sensor, a current sensor, a power sensor, or another type of sensor. The sensor 22 generates a signal indicative of operation of the first power source (e.g., utility 10). The sensor 22 may be connected between the switch 11 and the utility 10 or between the switch 11 and the load circuit 15. The switch 11 may switch off the connection from the first power source to the load circuit 15 in response to the detected electrical parameter.

The switch 11 may be a contactor, a relay or a transfer switch. A relay may include a housing that includes a switch that is electrically controlled using an electromagnet. The switch is made of contacts for the current path that is switched on and off by the switch. The switch may be controlled by the electromagnet, which generates a driving force for bringing the contacts in contact with each other, for completing the current path, or for bringing the contacts out of contact with each other, for breaking the current path. A contactor is a relay specialized for high current application and normally open contacts. Normally open contacts are in an open configuration (e.g., break in the current path) unless the relay is actuated. The relay may be normally closed. Normally closed contacts are in a closed configuration (e.g., completed current path) unless the relay is actuated.

A transfer switch or an automatic transfer switch (ATS) may detect an interruption in service from the utility and switch the load to the backup source of power. A manual transfer switch may provide similar functionality with a mechanical switch actuated by a user or an electronic switch actuated under user direction. The automatic transfer switch instructs the generator to start and subsequently transfers the output of the generator to the load.

The ATS may include only a switching component. The switching component is configured to control a connection between the load circuit 15 and a first power source. The first power source may be the utility source 10. Alternatively, the ATS may include a switching component and a detecting component. When the detecting component is included, the sensor 22 may be omitted or integrated with the switch 11. The detecting component may include one or more sensors for determining an electrical parameter of the first power source or the connection between the first power source and the load circuit 15. The detecting component generates a status signal for the switch 11 indicative of operation of the first power source (e.g., utility 10). In one example, the detecting component determines the presence or absence of the power signal from the utility 10 to the load circuit 15.

The switch 11 is electrically connected to the load circuit 15 and provides an electrical path between the utility source 10 and the load circuit 15. When the utility source 10 and the load circuit 15 are directly connected, the synchronous inverter 12 may not be used. Thus, the electrical path between the utility source 10 and the load circuit 15 is a bypass path configured to bypass the circuitry and provide power from the first power source to the load without performing the first conversion of power. The bypass path is activated or deactivated by a control circuit in response to a signal indicative of operation of the first power source.

When the detecting component determines that the electrical parameter falls above or below a threshold level, the switching component disables the connection between the load circuit 15 and the first power source. The transfer switch 11 may also be configured to control another connection between the load circuit 15 and a second power source. The switching component is also configured to output a signal indicative of the connection, which may indicate that the first power source is connected to the load circuit 15 or indicate that the first power source is not connected to the load circuit 15.

The synchronous inverter 12 may include two or more inputs and one or more outputs. The synchronous inverter 12 includes a first power input associated with a first power source. The first power source may a utility provider or a utility grid. The synchronous inverter 12 includes a second power input associated with a second power source. The second power source may include an energy storage device such as a battery 14 and/or the second power source may include an energy producing device such as the generator 13. The first power input and the second power input may include a connection, an electrical conductor, or a circuit configured to connect the synchronous inverter 12 to the external power sources.

The synchronous inverter 12 may is configured to perform a first conversion of power from a first format from the first power source (e.g., utility 10) to a second format for charging the second power source (e.g., battery 14) and perform a second conversion of power from the second format for the second power source (e.g., battery 14) to a third format for supplying a load.

In some instances, the synchronous inverter 12 may also include circuitry for directly connecting the utility source 10 to the load circuit 15 without performing any power conversions. The synchronous inverter 12 may include conversion circuitry and bypass circuitry. The conversion circuitry is configured to perform a first conversion of power from a first format from the first power source (e.g., utility 10) to a second format for charging the second power source (e.g., battery 14) and perform a second conversion of power from the second format for the second power source (e.g., battery 14) to a third format for supplying a load. The bypass circuitry is configured to pass power from the first power source to the load with no conversion by bypassing the conversion circuitry. The bypass circuitry may include electrical conductors that directly connect the first power source to the load. In one embodiment, the synchronous inverter 12 is configured to operate in a conversion mode (e.g., for converting the first format to the second format) and a bypass mode (e.g., for directly connecting the first power source to the load). Thus, the synchronous inverter 12 may internally include a bypass path configured to bypass the circuitry and provide power from the first power source to the load without performing the first conversion of power. The bypass path internal to the synchronous inverter 12 is activated or deactivated in response to a signal indicative of operation of the first power source.

Power or current may travel in one direction for the first conversion of power and in a second direction for the second conversion of power. That is, one or more circuit elements in the synchronous inverter 12 may carry current in one direction for the first conversion of power and another direction for the second conversion of power. The circuitry configured to perform a first conversion may include at least one controller (i.e., microprocessor) for controlling the network of internal switches (e.g., a segmented waveform converter).

The synchronous inverter 12 receives the signal for the connection from the switch 11 or the sensor 22. The synchronous inverter 12 is configured to select a combination of the network of internal switches in response to the signal indicative of the connection. The combination of the plurality of internal switches is selected to convert a power signal from a second power source from a first format associated with the second power source to a second format associated with the load circuit 15. The second power source may include the generator 13, the battery 14, or both. Because the utility 10 is connected directly with the load 15 and no power conversion (e.g., AC to DC or DC to AC conversions) are performed, power is not lost to inefficiencies (e.g., heat).

In response to the signal for the connection from the switch 11 or the sensor 22, the generator is instructed to start. In some examples, the generator 13 is independently connected to the sensor 22. In response to the indication from the signal for the connection from the switch 11 or the sensor 22 that the utility 10 has failed or dropped below a threshold output, the generator 13 starts an ignition sequence or begins to run. At the same time (e.g., simultaneously) or substantially the same time (e.g., within a time period such as 10 ms-10 seconds), the synchronous inverter 12 changes from the first conversion of power to the second conversion of power. For example, the synchronous inverter 12 may switch from providing the power from utility 10 to charge battery 14 to providing power from battery 14 to supply load 15.

Eventually, once the generator 13 has started running and/or reached a running speed or a predetermined speed, the generator 13 may charge battery 14, and the synchronous inverter 12 continues to provide power from the battery 14 to the load 15. With the battery 14 as an intermediary, the generator 13 provides power to the load 15 through the synchronous inverter 12. Thus, even while the generator 13 is running and providing power to the battery 14, the synchronous inverter 12 is performing the second conversion of power from the second format for the second power source (e.g., the battery 14) to the third format for supplying the load 15.

In some examples, the synchronous inverter 12 estimates that the generator 13 is running using a timer. A memory may include at least one time threshold that estimates an amount of time required for the generator 13 to start and/or reach a rated speed. The time threshold may be based on the model of generator 13, a size of the generator 13, or a fuel type of the generator 13. The synchronous inverter 12 may be configured to perform a comparison of time elapsed since the signal indicative of operation of the first power source to the at least one time threshold and select the first conversion of power or the second conversion of power in response to the comparison.

Through monitoring the output of the generator 13, the output of the battery bank, the demand of the load, the speed of the associated engine, the generator specific time threshold, some other quantity related to the engine, battery, load or a combination of the quantities, the synchronous inverter 12 transitions from the first conversion (e.g., power from the utility 10) to the second conversion (e.g., power from the battery 14) to the third conversion (e.g., power directly or indirectly from the generator 13). The transition from the first conversion to the second conversion may occur immediately or within a small amount of time or less than a predetermined amount of time associated with starting the generator. The predetermined amount of time may be less than a few seconds or less than a second. The transition from the second conversion to the third conversion may occur based on the expected performance of the generator 13, the actual performance of the generator 13, or according to a user setting. In one embodiment, the bypass circuitry is further configured to pass power from the generator 13 to the load without performing a conversion of power.

When the utility 10 suffers from multiple interruptions, some systems may turn the generator 13 on and off multiple times, causing undue wear, audible events and fuel usage. In an alternate system, the generator 13 is not switched on until just before the battery 14 runs out of stored energy or reaches a threshold of discharge. In some examples, the output of the battery 14 is monitored and the generator 13 is switched on in response to the monitoring of the battery 14. For example, when the voltage output of the battery 14 falls below a particular level, the generator 13 is started.

In another example, the user may introduce a delay such that the generator 13 is not started until after the utility 10 has been dead for a predetermined amount of time. The predetermined time value may be stored in memory and modified by a user. Through setting the predetermined time value, the user is able to prevent the generator 13 from starting during short interruptions in the utility 10. The battery 14 provides power during these short interruptions. Examples time values for the predetermined amount of time may include 10 seconds, 30 seconds, 1 minute, 5 minutes, or 10 minutes. Alternatively, the synchronous inverter 12 access the time value from memory and delays the transition for the load circuit 15 from the second power source to the third power source until the time value has elapsed. Alternatively, a processor controlling the synchronous inverter 12 may also learn the optimal time for starting the generator by measuring the battery level when the generator 13 comes online and adjusting up the delay time until the generator 13 comes online near a low charge level of the battery 14.

In yet another example, the generator may start and recharge the battery to a known level before stopping and allowing the system to run from battery only. This strategy may be enabled by a load level, a time of day, battery type, battery temperature, information from a utility service provider, user input, pre-configured preferences, or other factors or combination of factors.

Figure 3:
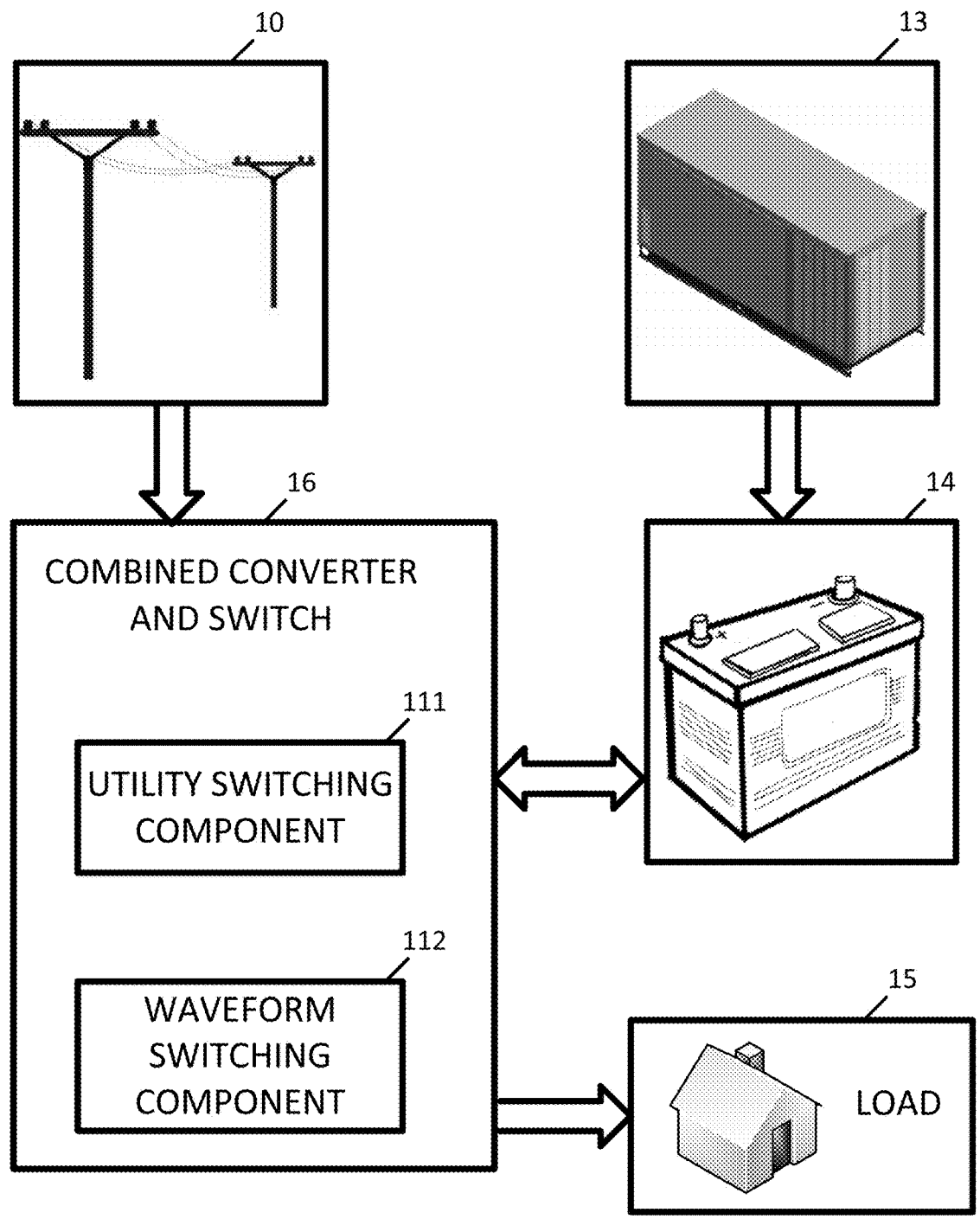
FIG. 3 illustrates another example generator and battery backup using a combined converter and switch.

FIG. 3 illustrates another example generator and battery backup using a combined converter and switch 16. Components similar to previously described components include the same structure and/or function unless specified otherwise. Any aspects of this embodiment may be combined with other embodiments. Additional, different or fewer elements may be included.

The combined converter and switch 16 may include a sensor 20, as shown in the embodiment of FIG. 2. The combined converter and switch 16 may internally determine an electrical parameter of the first power source or the connection between the first power source and the load circuit 15. The combined converter and switch 16 may include a voltage sensor, a current sensor, a power sensor, or another type of sensor and corresponding circuitry for operation of and collection of data from the sensor.

The combined converter and switch 16 may include mechanical components, processing components, and, in at least one alternative embodiment, software components. The mechanical components may include a mechanical switch that includes contacts for electrically connecting the utility 10 to the load 15. The mechanical switch may be actuated by an electrical switch controlled by a switch control signal. The combined converter and switch 16 may generate the switch control signal internally.

The processing components may include one or more microprocessors or controllers configured to receive and process data and generate a current conversion instruction in response to the data. The data may be from the sensor or internal sensing component related to the status of the utility 10 and the data. The status may be data indicative of operation, failure, or undetermined. The status may be based on an electrical parameter (e.g., voltage, current, or frequency). An operation status indicates that the electrical parameter is in a first range, and a failure status indicates that the electrical parameter is in another range. In some examples, an undetermined status indicates that the electrical parameter is between the operational range and the failure range. In some examples, the undetermined status indicates that the data is incomplete. The processing components generate a current conversion instruction in response to one or more of the operational, failure, or undetermined status data.

These components of the combined converter and switch 16 may also be represented as a utility switching component 111 and a waveform switching component 112. The utility switching component 111 is configured to control a connection between the load circuit 15 and a first power source (e.g., the utility source 10). The utility switching component 111 may pass the utility 10 to the load 10. The utility switching component 111 may detect a failure and/or abnormality in the power signal from the utility source 10. The utility switching component 111 sends data indicative of the failure or abnormality to the waveform switching component 112, which selects the power conversion in response to the data indicative of the failure or abnormality.

The current conversion instruction may activate a combination of switches or transistors in the waveform switching component 112 to convert power from one format to another format. One combination of transistors may convert power from the utility 10 format to the load 15 format, another combination of transistors may convert power from the battery 14 format to the load 15 format, and another combination of transistors may convert power from the utility 10 format to the battery 14 format. In one example, the first combination to convert from the utility 10 format to the load 15 format may only pass the power signal through the combined converter and switch 16 (i.e., the combination of switches may only provide a direct path for the current or deactivate the combined converter and switch 16). In another example, the first combination to convert from the utility 10 format to the load 15 format may adjust the frequency or amplify of the utility 10.

Figure 4:
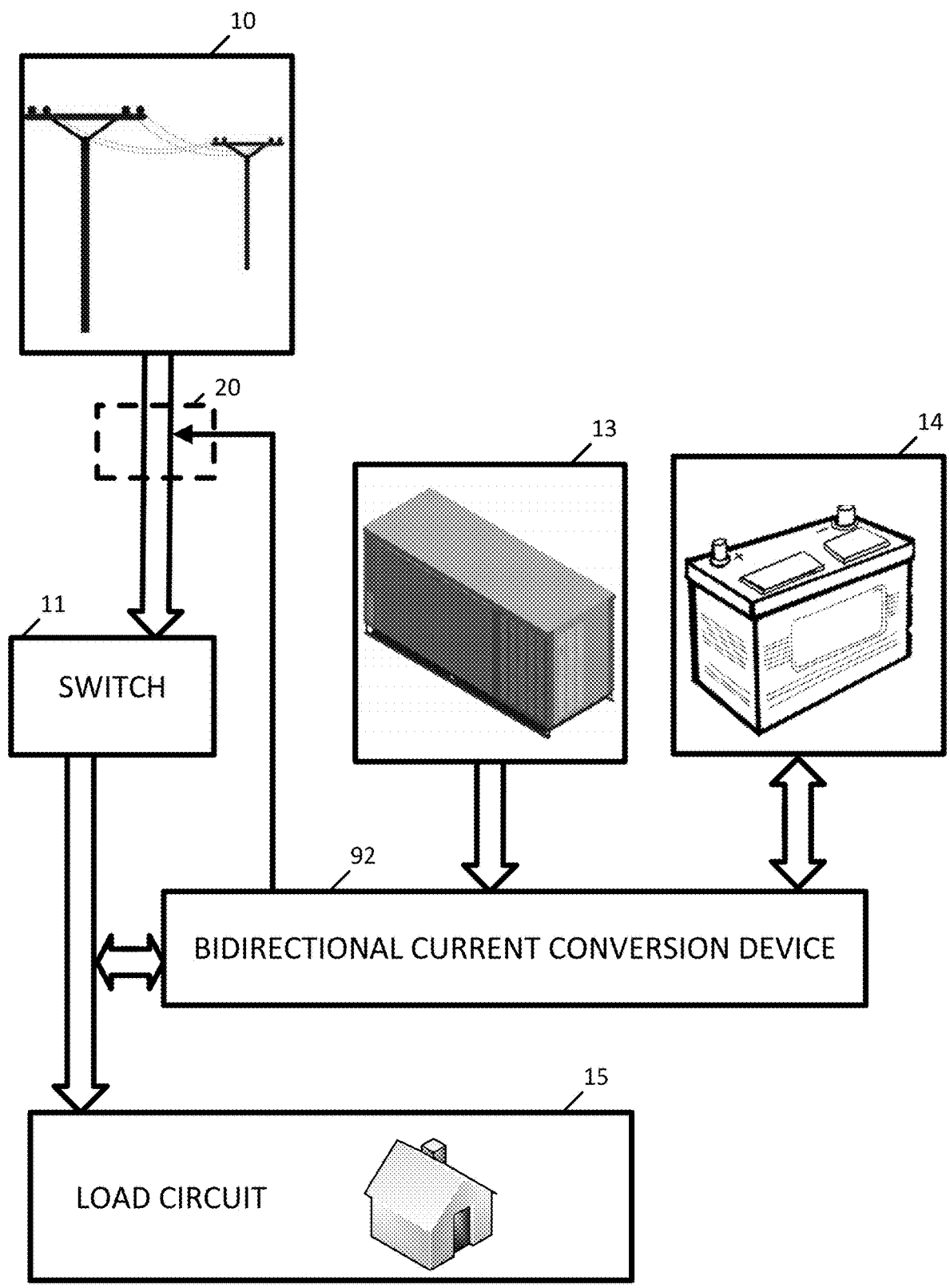
FIG. 4 illustrates another example generator and battery backup using a bidirectional current conversion device.
Figure 5:
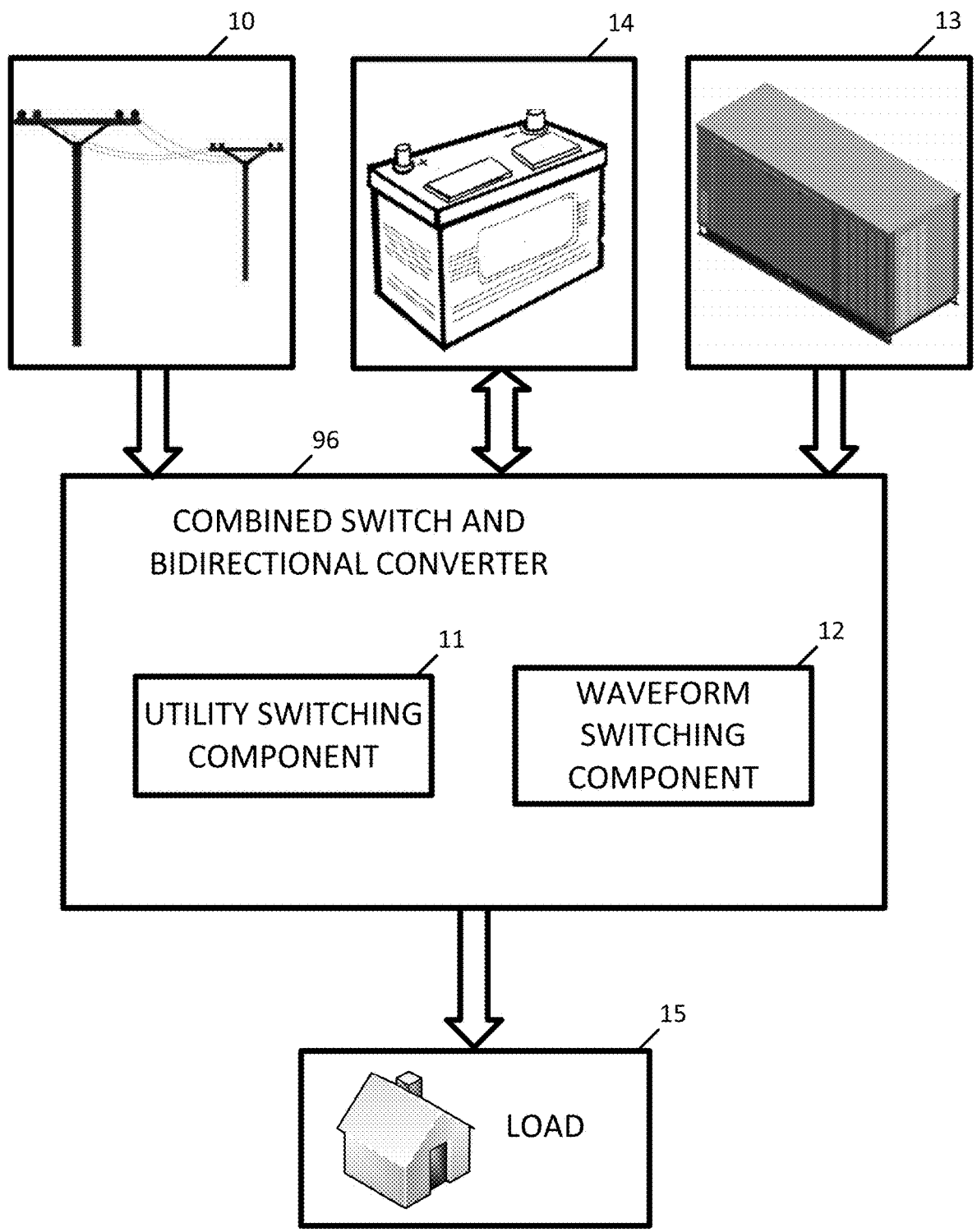
FIG. 5 illustrates another example generator and battery backup using a combined switch and bidirectional current conversion device.

FIG. 4 illustrates another example generator and battery backup using a bidirectional current conversion device 92. FIG. 5 illustrates another example generator and battery backup using a combined switch and bidirectional converter 96. In FIG. 5, the utility switching component 12 is configured to supply power to the load 15. In this application, the switching components reside in a combined switch, providing similar behavior while potentially lowering the cost and installation complexity. The waveform switching component 12 may receive power from the generator 13, the battery 14 or the utility 10 and may transfer the power to the battery 14 or the load 15.

Figure 6:
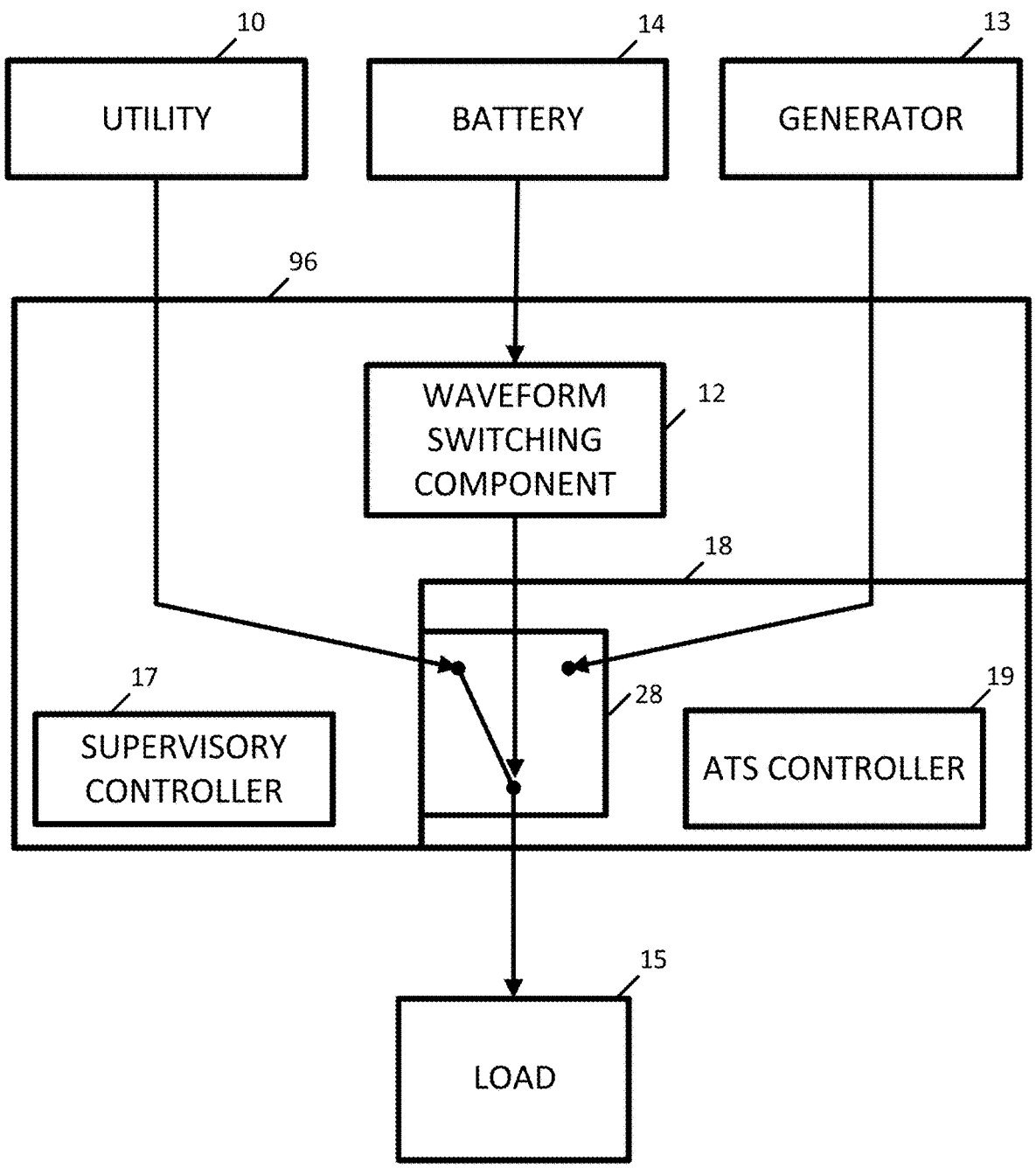
FIG. 6 illustrates another example generator and battery backup using a combined switch and bidirectional current conversion device.

FIG. 6 illustrates yet another example generator and battery backup using a transfer switch 18, a waveform switching component 12 such as an inverter, and a combined switch and bidirectional converter 96. The transfer switch 18 (transfer switch device) is connected to allow selective connection of the load to either the utility, the generator, or neither. The transfer switch 18 may contain a mechanical switch 28 transfer switch controller 19 which detects an abnormal or lost power condition on the utility 10 or generator 13 and controls the position of the transfer switch 18.

The transfer switch 18 may be controlled by the same controller as the waveform switching component 12, where the detection of abnormal or lost power is performed by the waveform switching component 12. Both the waveform switching component 12 and the transfer switch 18 may be controlled by a supervisory controller 17.

The transfer switch controller 19, supervisory controller 17 waveform switching component 12, or combination thereof may disconnect the load from the utility 10 using the transfer switch 18, transferring the transfer switch 18 to a disconnected position, feed the load through the waveform switching component 12 until the generator 13 is able to provide power, synchronize the output of the waveform switching component 12 to the generator 13 and transfer the transfer switch 18 to feed the load from the generator 13. Synchronizing may be performed by the generator 13 or by the waveform switching component 12.

Alternatively, the transfer switch controller 19, supervisory controller 17 waveform switching component 12, or combination thereof may disconnect the load from the utility using the transfer switch 18, transferring the transfer switch 18 to a disconnected position, feed the load through the waveform switching component 12 until the generator is able to provide power, transfer the transfer switch to feed the load from the generator, and prevent damage to the waveform switching component by controlling current, disabling the output, or providing some other failure prevention technique.

In the embodiment illustrated in FIG. 6, the waveform switching component 12 is connected to the load at substantially all times. This presents a challenge for operating the waveform switching component 12 in that the output of the waveform switching component 12 is often connected to one of the other sources utility 10 or generator 13. The waveform switching component 12 may allow enabling and disabling, operating in various modes including charging and discharging, or synchronizing with either or both sources.

Additional embodiments are contemplated where the waveform switching component 12 is selectively connected to the load 15, providing an additional source for the transfer switch 18 to select. This application presents the challenge of a momentary disconnection of the power to the load, but this interruption may not cause noticeable power interruption if kept to a sufficiently short delay, such as 10 ms.

Referring to FIGS. 4 and 5, the combined switch and bidirectional converter 96 may be interchangeable with the bidirectional current conversion device 92 in the following embodiments. Components similar to previously described components include the same structure and/or function unless specified otherwise. Any aspects of this embodiment may be combined with other embodiments. Additional, different or fewer elements may be included.

The bidirectional current conversion device 92 is configured to convert currents of one characteristic to currents of another characteristic. The bidirectional current conversion device 92 may include a conversion component as a selectively controlled rectifier, a selectively controller inverter, and/or a selectively controlled transformer. A controller or switching circuit in the bidirectional current conversion device 92 may switch on one or more rectifier circuits when converting from AC to DC and one or more inverter circuits when converting from DC to AC. In addition, the controller or switching circuit may switch on one or more transformer or frequency modification circuit when converting from AC to AC. The direction of current flow through the bidirectional current conversion device 92 may be controlled by a direction circuit.

The bidirectional current conversion device 92 may include multiple modes of operation, as summarized in Table 1. In a utility to battery charging mode the switching circuit in the bidirectional current conversion device 92 may switch on one or more rectifier circuits for converting from AC to DC in a direction between the utility 10 and the battery 14 (e.g., the direction circuit is set for battery charging or reverse).

In a generator to battery charging mode the switching circuit in the bidirectional current conversion device 92 may switch on one or more rectifier circuits for converting from AC to DC in a direction between the generator 13 and the battery 14 (e.g., the direction circuit is set for battery charging or reverse).

In a generator to load mode the switching circuit in the bidirectional current conversion device 92 may switch on one or more circuits for converting from AC to AC in a direction between the generator 13 and the load 15 (e.g., the direction circuit is set for supplying load or forward). The generator 13, a third power source, is connected through a third power input in the bidirectional current conversion device 92. The circuitry of the bidirectional current conversion device 92 is configured to perform a third conversion of power from a fourth format from the generator 13 to the second format for charging the battery 14. Likewise, the bidirectional current conversion device 92 includes circuitry to perform a fourth conversion of power from the fourth format from the generator 13 to the third format for supplying the load circuit 15.

In a generator starting mode, the switching circuit in the bidirectional current conversion device 92 may switch on one or more circuits for converting from DC to AC in a direction between the battery 14 and the generator 13 for starting the generator 13. For example, the output of the battery 14 may be converted to AC for operating a starter motor and starting the generator 13. The generator starting mode may be triggered by the outage of the utility 10, or a predetermined time after the outage of the utility 10. Thus, the bidirectional current conversion device 92 is configured to perform another conversion of power from the second format for the second power source to a cranking format for starting the engine of the generator. The cranking format may be a direct current power signal or a low frequency power signal at a predetermined voltage or current for starting the engine of the generator.

In a battery to load mode the switching circuit in the bidirectional current conversion device 92 may switch on one or more inverter circuits for converting from DC to AC in a direction between the battery 14 and the load 15 (e.g., the direction circuit is set for supplying load or forward). In a utility to load mode the bidirectional current conversion device 92 may be switched off such that the utility 10 is connected directly to the load circuit. In the embodiment of FIG. 5, the combined switch and bidirectional converter 96 may also perform AC to AC conversion on the utility signal to adjust amplitude, frequency, or another property, which is not reflected in Table 1.

TABLE 1

| Mode | Conversion Component | Direction Switching | Source | Sink |
| --- | --- | --- | --- | --- |
| Utility charging battery | AC to DC | Reverse | Utility | Battery |
| Generator charging Battery | AC to DC | Reverse | Generator | Battery |
| Generator load | AC to AC | Forward | Generator | Load |
| Battery load | DC to AC | Forward | Battery | Load |
| Utility load | N/A | N/A | Utility | Load |
| Battery starter | DC to AC | Reverse | Battery | Generator |

The bidirectional current conversion device 92 may select a mode according to one or more inputs. The inputs may include the sensor 22, feedback from the load 15, feedback from the switch 11, feedback from the transfer switch 18, and feedback from the battery 14.

The bidirectional current conversion device 92 may receive feedback from the battery 14, the generator 13, the utility 10 or any combination thereof. The feedback from the battery 14 may be indicative of an output of the battery 14. The bidirectional current conversion device 92 may select a mode in response to the feedback from the battery 14. For example, when the battery output falls below a battery low threshold, the bidirectional current conversion device 92 may transition from the battery load mode to the generator load mode.

The feedback from the generator 13 may be indicative of an output of the generator 13. The bidirectional current conversion device 92 may select a mode in response to the feedback from the generator 13. For example, when the generator output reaches a generator minimum threshold, the bidirectional current conversion device 92 may transition from the battery load mode to the generator load mode. In another example, when the generator output falls below the generator minimum threshold, as a result of a failure or abnormality with the generator 13, the bidirectional current conversion device 92 may transition from the generator load mode to the battery load mode.

The feedback from the utility 10 may be indicative of an output of the utility 10. The bidirectional current conversion device 92 may select a mode in response to the feedback from the utility 10. For example, when the utility output falls below a utility low threshold, the bidirectional current conversion device 92 may transition from the utility load mode to the battery load mode. In addition or in the alternative, when the utility output galls below the utility load threshold, the bidirectional current conversion device 92 may initiate the generator starting mode.

The feedback from one or more of the utility 10, generator 13, load 15, and the battery 14 may be used to control charging of the battery. In response to the battery 14 falling below a charged level, the bidirectional current conversion device 92 may initiate either the utility charging mode or the generator charging mode. In one example, the utility charging mode is implemented unless the utility has a failure. Alternatively or in addition, the generator charging mode may be implement always when the generator 13 is running. The bidirectional current conversion device 92 may be configured to switch between the utility charging mode and the generator charging mode in response to feedback from the utility 10 or feedback from the generator 13.

Figure 7:
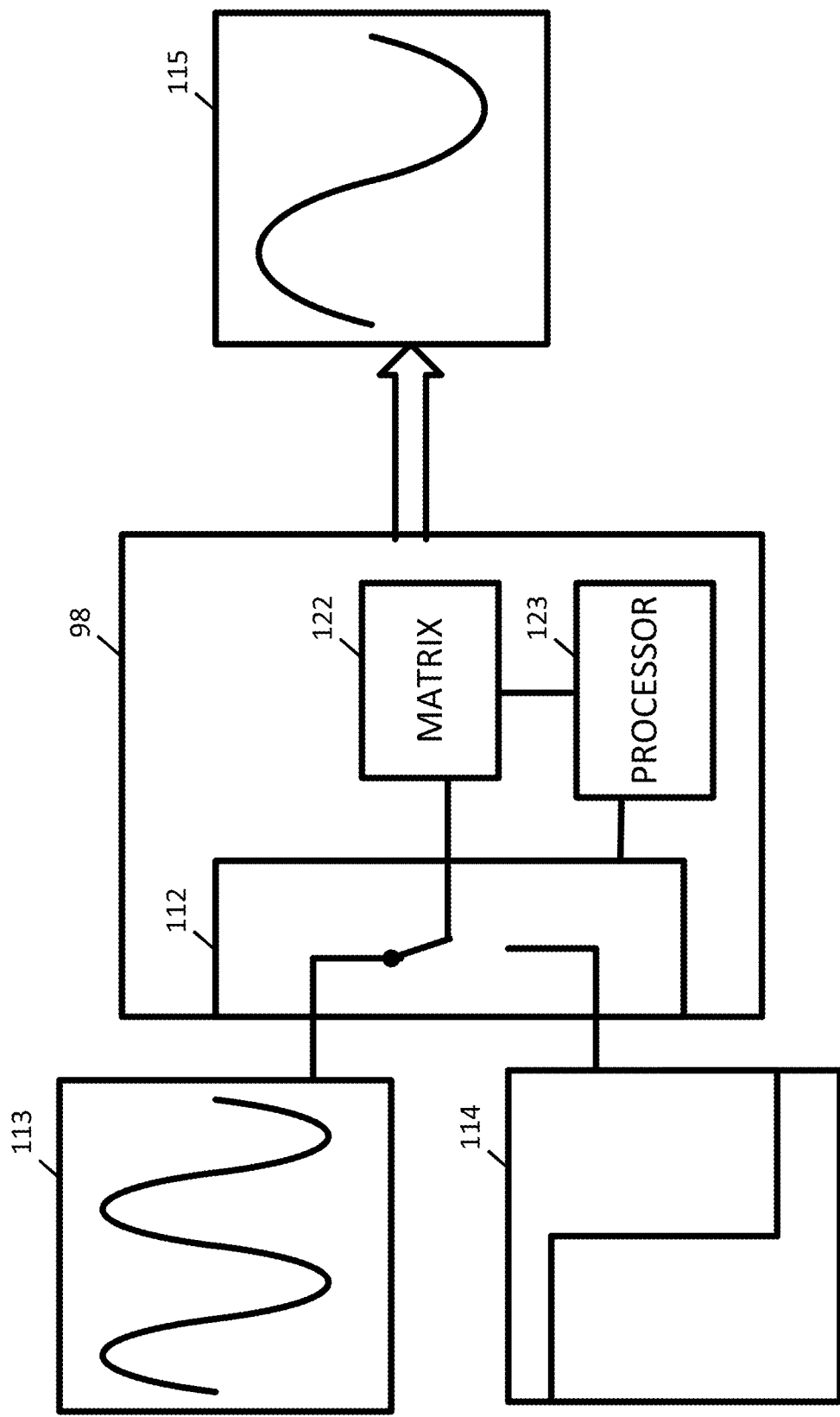
FIG. 7 illustrates example waveforms for the power sources and output.

FIG. 7 illustrates an example conversion device 98 (e.g., the synchronous inverter 12, the combined converter and switch 16, the bidirectional current conversion device 92, or the combined switch and bidirectional converter 96) including a selection component 112 and a conversion component or matrix 122. At any given time the selection component may receive an input waveform from either an AC source 113 or a DC source 114. The matrix 122 converts the input waveform to a desired output waveform 115 for the load. The processor 123 may instruct the settings of the matrix 122 or the selection component 112. That is, the processor 123 is configured to select a first conversion of power from a first format from a utility to a second format for charging a battery, perform a second conversion of power from the second format for the battery to a third format for supplying a load, a third conversion of power from the a fourth format from a generator to third format for supplying the load, a fourth conversion of power from the fourth format from the generator to the second format for charging the battery, and a fifth conversion of power from the battery to a fifth format for operating a starting motor for starting the generator. The processor 123 is also configured to perform a comparison of time elapsed since a signal indicative of operation of the first power source to at least one time threshold and select the first conversion of power or the second conversion of power in response to the comparison.

Figure 8:
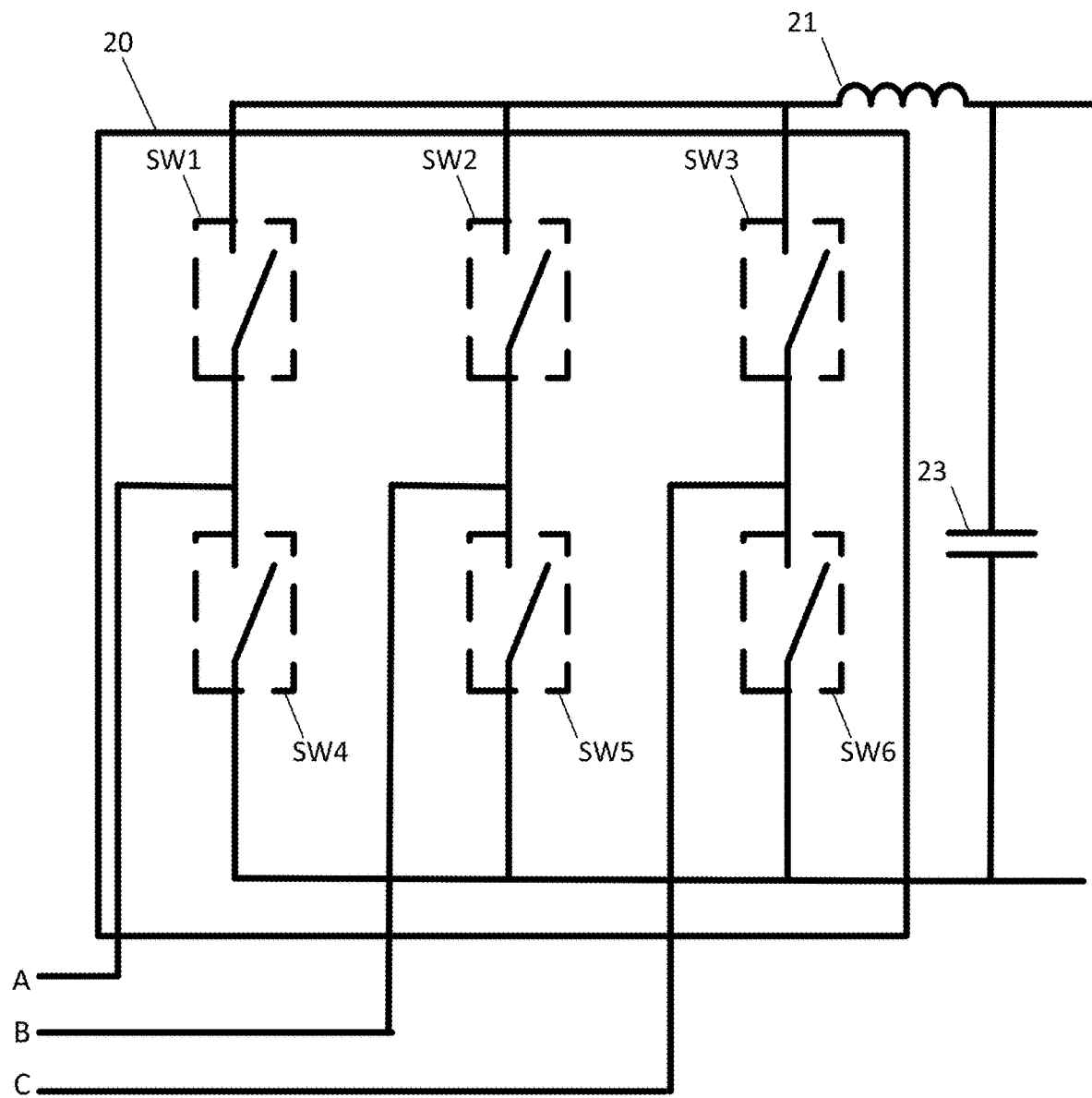
FIG. 8 illustrates an example single phase synchronous inverter.

FIG. 8 illustrates an example single phase synchronous inverter. The controlled field or permanent magnet alternator on the generator 13 provides the poly-phase signal to the synchronous inverter 12 that includes a network of switches that selectively controls passing a combination of the components of the poly-phase signal to the output for the load circuit 15. For example, consider an example in which the poly-phase signal includes two components, A and B. The network of switches could provide several combinations of the two components to the output, which may include only the A component, only the B component, an additive signal of A+B, a subtracted signal of A−B or B−A, and 0 or a null signal, which may be achieved by A−A or B−B.

Before the output to the load circuit 15, the synchronous inverter 12 may include an output filter and electrical quantities may be measured by the controller at the output filter by one or more sensors. The controller of the synchronous inverter 12 may be configured to provide a control signal for the network of switches based on measured electrical quantities associated with the output filter and provide a field current control signal to the controlled field alternator.

The controller may receive the electrical quantities from at least one sensor. The controller may perform a calculation or consult a lookup table to determine a combination of the components of the poly-phase signal to pass to the output for the load circuit 15. In one example, a lookup table relates combinations of available voltages to different settings for the plurality of switches. The available voltage may change over time. In one example, the available voltages vary according to a time-based schedule of expected values. In another example, the available voltages vary according to measured values.

A segmented waveform converter 20 includes a network of switches SW1-6 and at least one energy storing device. The example shown in FIG. 8 includes an inductor 21 and a capacitor 23. The inputs, A, B, and C, to the segmented waveform converter 20 are components of the poly-phase AC waveforms.

In one example, the segmented waveform converter 20 is configured to supply a control signal to each of the switches for any combination of two or fewer of the components of the poly-phase input waveform. The control signal may include A, B, C, A–B, A–C, B–C, B–A, C–B, C–A, and 0. Other switch configurations may be configured to provide other combinations, such as additive combinations A+B, B+C, and A+C, using a switch configuration other than that illustrated. In another example, the segmented waveform converter 20 is configured to supply a predetermined set of outputs based on combinations of the components of the poly-phase input waveform. The predetermined set of outputs may include a subtractive combination of exactly two of the components, including A–B, A–C, B–C, B–A, C–B, and C–A. The predetermined set of outputs may include 0, any single component (A, B, or C) or any subtractive combination of exactly two of the components.

The controller may access a target output level as a function of time. For example, the target output may be an AC waveform at a specific frequency and/or a specific amplitude. The target output level may be stored as a series of time based target values. For example, time values are associated with target output levels (e.g., {time1, output1}, {time2, output2}). The target output level may follow a sinusoidal function, and the target output levels may be computed based on a specified voltage and frequency for the output.

The controller may calculate a target electrical parameter for the output filter. In one example, the controller calculates a target current for the inductor 21, and in another example, the controller calculates a target voltage for the capacitor 23. The controller may calculate a desired change in the electrical parameter based on a measured quantity (e.g., voltage or current) at the output filter. The controller may calculate a change value (delta) based on the difference between the target output level and the current measured quantity. The controller may compare the change values to the available output segments from the combinations of components and selects the closest combination.

TABLE 2

| Time | A-B | B-C | C-A | B-A | C-B | A-C | Target |
|---|---|---|---|---|---|---|---|
| 1 | 49 | 163 | -212 | -49 | -163 | 212 | 110 |
| 2 | -80 | -135 | 215 | 80 | 135 | -215 | 168 |
| 3 | -197 | 173 | 24 | 197 | -173 | -24 | 18 |
| 4 | 201 | -25 | -176 | -201 | 25 | 176 | -150 |
| 5 | -94 | 230 | -136 | 94 | -230 | 136 | -170 |
| 6 | 196 | -189 | -7 | -196 | 189 | 7 | -75 |

Different switch combinations correspond to different output ranges. For example, at time interval 3 on Table 2, combination C-A provides 24V, which is closest to the target at time interval 3 (18). In another example, at time interval 2, combination C–B provides 135, which is the closest to the target at time interval 2 (168). For each time interval, the controller selects one of the possible combinations. Only six combinations are shown, but more combinations are possible. A lookup table based on a single phase measurement may be used. Alternatively, each phase may be measured and compared. The controller may compare the possible combinations to the target value and select the closest combination. The controller generates a field current control signal for the selected combination. The controller may output an individual control signal for each of the switches SW1-6. Each switch SW1-6 may be either on or off. Each of the combinations represents different current paths through the segmented waveform converter.

As another example, the controller may select the switch combination that provides that largest voltage to the output and determine a pulse width modulated (PWM) duty cycle to operate between that switch combination and a freewheeling state. The PWM duty cycle may be chosen based on a ratio between the target voltage and the available voltage, a predetermined sequence, a closed-loop output voltage controller, a model-based control of the output, or a similar technique.

The controller may determine whether the closest available combination is within a threshold difference to the target. When the closest available combination is farther away from the target than the threshold, the controller may apply PWM control to adjust the signal. For example, a PWM duty cycle may be applied to the closest combination to approach the target. In another example, when the closest available combination is farther away from the target than the threshold, the controller first selects the available combination that is greater than the target. Then, the controller applies a PWM duty cycle to adjust the selected combination to approach the target. The PWM duty cycle may be calculated according to Equation 1.

$$\text{PWM Duty Cycle} = \text{Target/Selected Combination Output} \qquad \text{Eq. 1.}$$

For example, consider the example at time interval 2, combination C–B provides 135, which is the closest to the target at time interval 2 (168). The controller may revert to the next largest output (215) from combination (C-A). Using Equation 1, the PWM duty cycle would be (168/215)=0.78 or 78%. In one example, the PWM duty cycle may be finely tuned (e.g., every 1%). In another example, a few examples are available and the closest PWM duty cycle is selected. For example, when five duty cycles are available, the options may be 20%, 40%, 60%, 80%, and 100%. In the example above, when equation 1 provides 78%, the PWM duty cycle of 80% is selected.

Table 3 illustrates example control signals for each of the switches in order for the segmented waveform converter 20 to provide the various output levels or combination of components of the poly-phase signal. The controller may include an output pin for each of the switches to provide the individual control signals to the switch. In another example, the segmented waveform converter 20 may include a switch controller that receives a bitwise signal according to rows of Table 3. For example, each series of bits corresponds to a set of control signals in the format {SW1, SW2, SW3, SW4, SW5, SW6}.

TABLE 3

|     | SW1 | SW2 | SW3 | SW4 | SW5 | SW6 |
|-----|-----|-----|-----|-----|-----|-----|
| A-B | 1 | 0 | 0 | 0 | 1 | 0 |
| A-C | 1 | 0 | 0 | 0 | 0 | 1 |
| B-C | 0 | 1 | 0 | 0 | 0 | 1 |
| B-A | 0 | 1 | 0 | 1 | 0 | 0 |
| C-B | 0 | 0 | 1 | 0 | 1 | 0 |
| C-A | 0 | 0 | 1 | 1 | 0 | 0 |
| 0 or A-A | 1 | 0 | 0 | 1 | 0 | 0 |
| 0 or B-B | 0 | 1 | 0 | 0 | 1 | 0 |
| 0 or C-C | 0 | 0 | 1 | 0 | 0 | 1 |

The controller may calculate a target electrical parameter for the output filter. In one example, the controller calculates a target current for the inductor 21, and in another example, the controller calculates a target voltage for the capacitor 23. The controller may calculate a desired change in the electrical parameter based on a measured quantity (e.g., voltage or current) at the output filter. The controller calculates a change value (delta) based on the difference between the target output level and the measured quantity. The controller compares the change values to the available output segments from the combinations of components and selects the closest combination.

The filter components Inductor 21 and capacitor 23 may be selected to minimize THD on the output of the inverter. They may also be selected based on a target switching frequency of the segmented waveform converter. The filter components may be replaceable or integral to the design. The filter components may be different based on target output voltages and frequencies from the inverter. As an example, the inductor 21 may be decreased in size when the output frequency increases. As another example, the capacitor may be increased in size for a lower voltage application. The filter components may vary by application, such as decreased filter size when feeding a motor load or increased filter size when feeding a sensitive load.

The filter components may also enable the inverter to control short-circuit current by limiting the rate that the current through the switch can rise. The current control may provide a sinusoidal, trapezoidal, saw-tooth, triangular, DC, square-wave or otherwise shaped output current into a short circuit. The frequency of the output current into a short circuit may differ from nominal frequency. The current control may provide a high level of output current slowly decreasing to a lower level of output current. As an example, the current control may provide 300% of rated generator current into a short circuit for 2 seconds, then decrease the output current to 100% of rated current over the next 5 seconds. As another example, the current control may provide 300% of rated generator current into a short circuit for 5 seconds, then stop sourcing current.

Figure 9A:
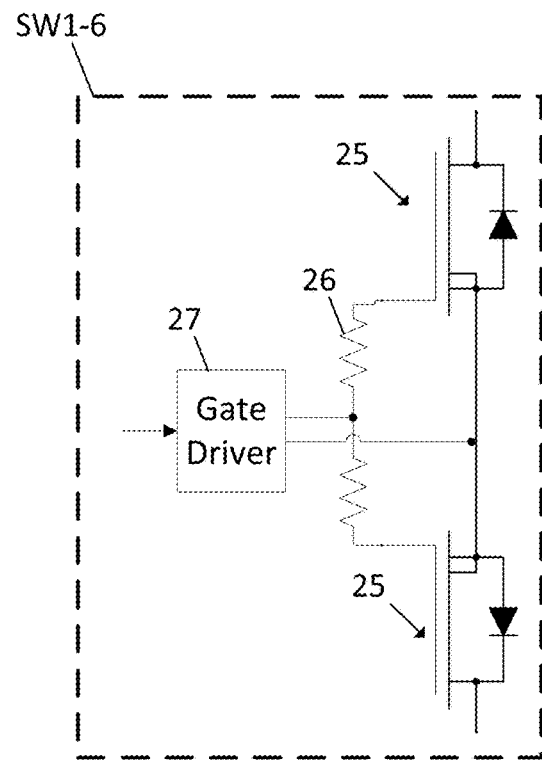
FIGS. 9A and 9B illustrate example switches for the synchronous inverter.

FIG. 9A illustrates example switches SW1-6 for the segmented waveform converter 20. The switches SW1-6 include a pair of transistors 25 (e.g., metal-oxide-semiconductor field-effect transistors or MOSFETs) which are controlled by a gate driver 27 through one or more gate resistors 26. The sources of the transistors 25 may be directly electrically connected. The switches may also utilize a plurality of transistors connected in parallel in order to increase the current rating or to decrease the losses in the power conversion.

The switches are configured such that they block current traveling in either direction. This allows the segmented waveform converter to switch between two AC waveforms. The body diode, if present, on each transistor can conduct when the transistor is conducting in one direction, so the voltage drop across one transistor is typically lower than the other. Separate diodes may also be included for this function. The gate driver circuit provides the necessary isolation to allow the sources of the switches to float relative to the input and output of the converter, while providing a voltage or current referenced to the sources to trigger the switch. The gate drivers pass a digital signal from the controller to the actual switch.

Figure 9B:
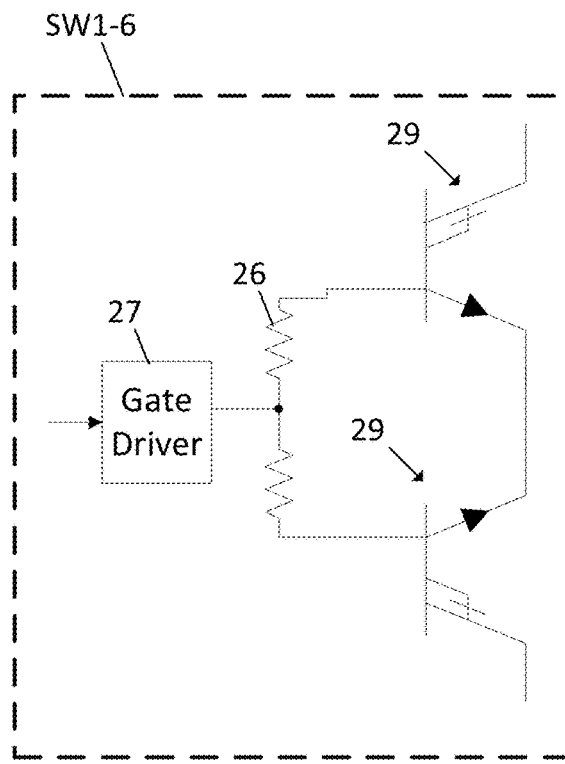

FIG. 9B illustrates another example switches SW1-6 for the segmented waveform converter 20. The switches SW1-6 include a pair of transistors 29 (e.g., insulated-gate bipolar transistor (IGBT) or another three-terminal power semiconductor device.) The emitters of the transistors 29 may be directly electrically connected. The switches may also utilize a plurality of transistors connected in parallel in order to increase the current rating or to decrease the losses in the power conversion. The emitters may be connected using paralleling resistors if the thermal characteristics of the IGBTs are not conducive to paralleling.

The switches are configured such that they block current traveling in either direction. This allows the segmented waveform converter to switch between two AC waveforms. The body diode on each transistor can conduct when the transistor is conducting in one direction, so the voltage drop across one transistor is typically lower than the other. Separate diodes may also be included for this function. The gate driver circuit provides the necessary isolation to allow the emitters of the switches to float relative to the input and output of the converter, while providing a voltage or current referenced to the emitters to trigger the switch. The gate drivers pass a digital signal from the controller to the actual switch.

Figure 10:
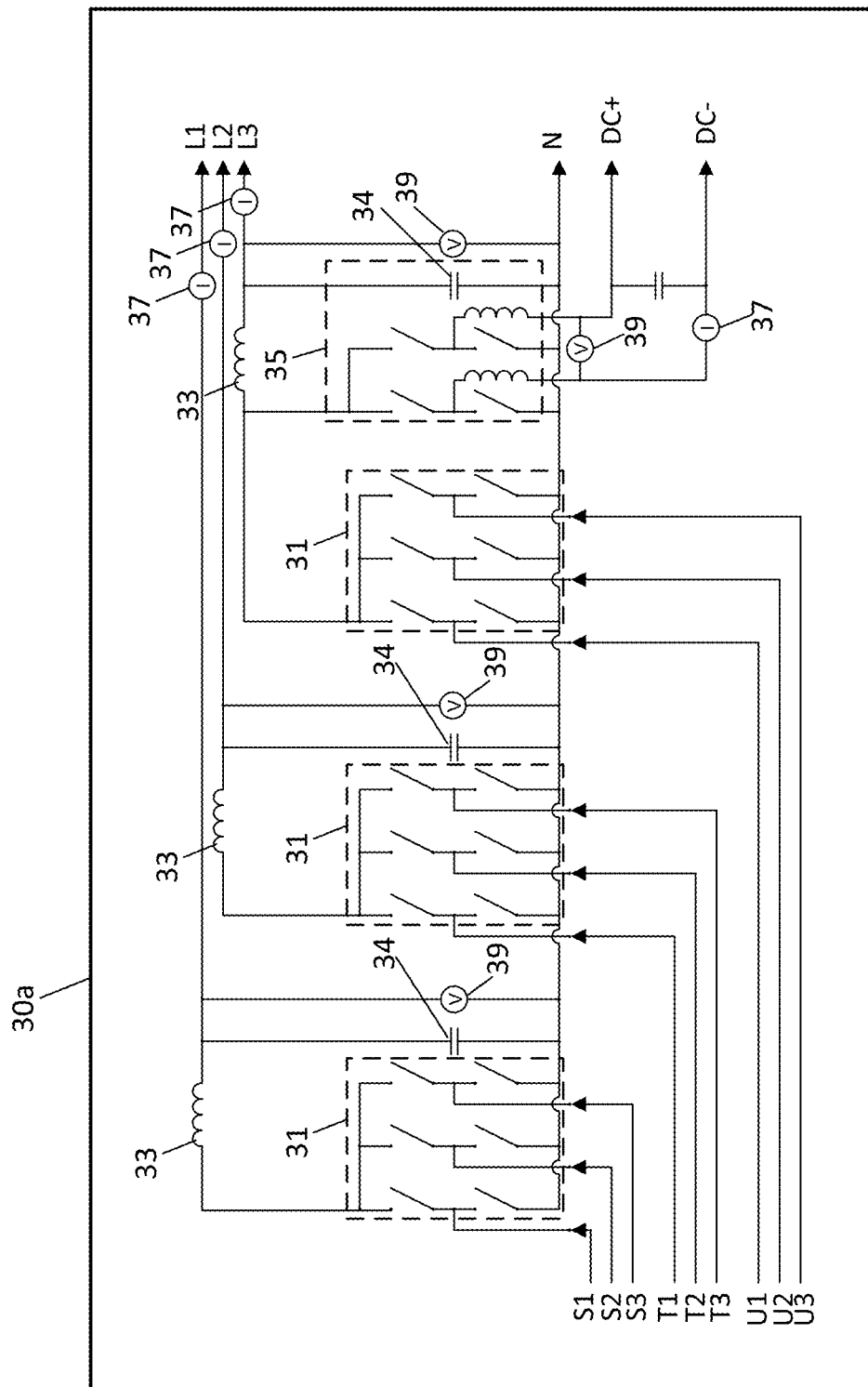
FIG. 10 illustrates an example three phase segmented waveform converter with alternator field current control.

FIG. 10 illustrates an example network 30a of segmented waveform converters. The inputs to the network 30a include S1, S2, and S3 for the first segmented waveform converter, T1, T2, and T3 for the second segmented waveform converter, and U1, U2, and U3 for the third segmented waveform converter. The outputs of the network 30 include one output line (L1, L2, L3) for each of the segmented waveform converters. The energy storing devices 33, which may be inductors, in combination with energy storing devices 34, which may be capacitors, combine to form an output filter. The measurement points 37, for current, and 39, for voltage, illustrate example locations on the network 30 where electrical quantities may be measured for controlling the segmented waveform converters. Other voltage and current measurement locations may be utilized. A circuit 35 includes a field current power supply for generating a field current (DC+, DC−) that is transmitted back to the field coils of the alternator.

Figure 11:
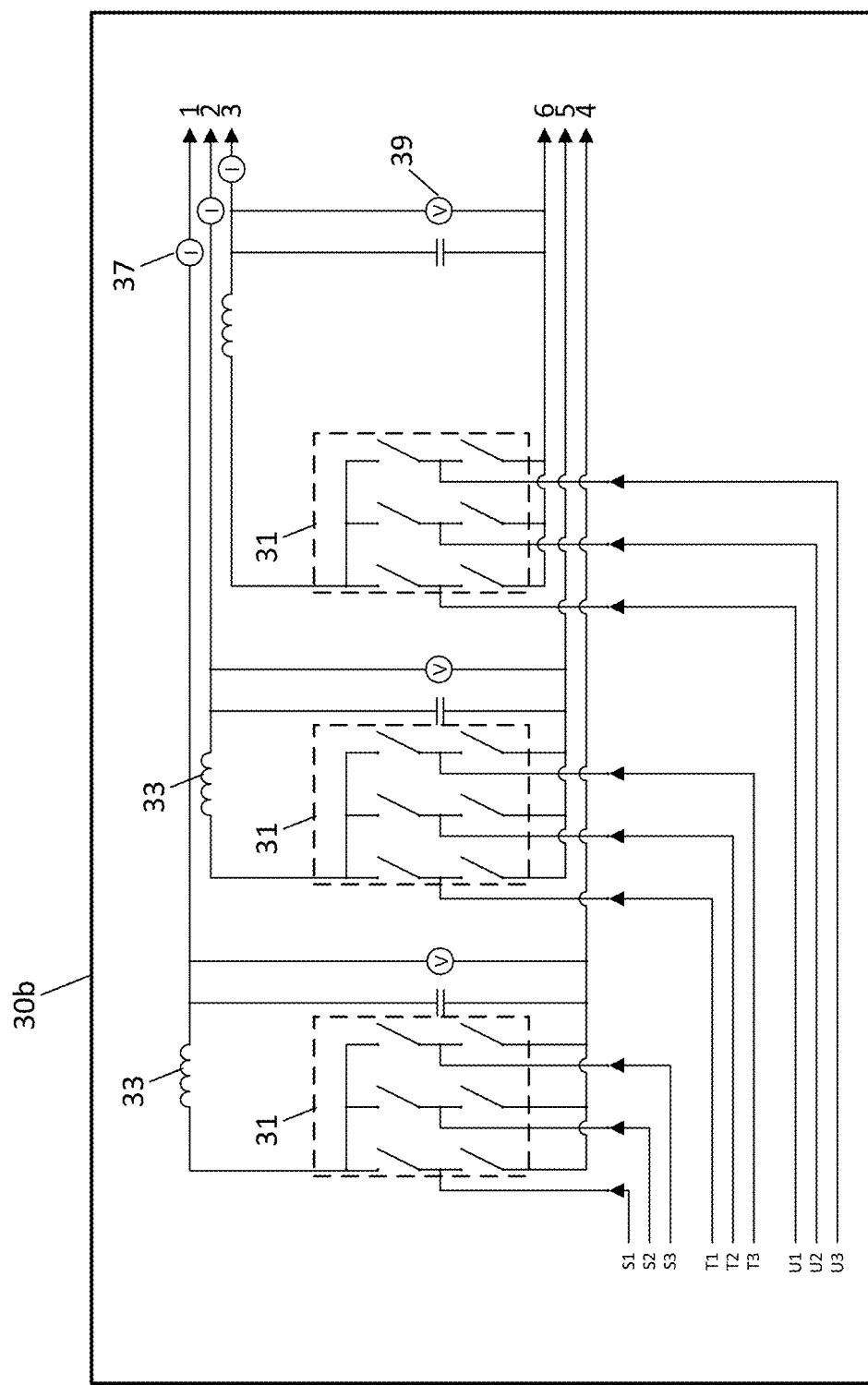
FIG. 11 illustrates another example three phase segmented waveform converter.

In FIG. 11 each of the segmented waveform converters share the neutral connection (N). Thus, each of L1 and L2 and L3 can be connected only in parallel or in a three-phase wye configuration. FIG. 10 illustrates another example three phase segmented waveform converter in which each of the segmented waveform converters are independent and can be connected in any configuration.

Each of the converters is capable of providing a single-phase AC output, but the phase between the outputs may be fixed such that the network of converters produces a polyphase AC output. For example, the output of the three converters, between 1 and 4, 2 and 5, and 3 and 6, may be fixed at 120 electrical degrees apart, providing three phase power. As another example, the three outputs, between 1 and 4, 2 and 5, and 3 and 6, may all produce voltage at the same phase angle, allowing them to be connected in parallel to provide increased current sourcing capability in a single-phase application. In yet another example, one of the three outputs, 3 and 6, could produce voltage at 180 electrical degrees from the other two, 1 and 4, 2 and 5, allowing center-tap single-phase output voltages such as 120/240. In this case, one of the output lines from the generator has double the current rating of the other output line because two converters are connected in parallel. In another example, outputs 1 and 4 may be 180 electrical degrees from 2 and 5 with 3 and 6 at the same phase angle as 1 and 4 with twice the magnitude. This enables center-tap single-phase output voltages with balanced line current ratings but only half the line current is available from the neutral connections. This final configuration may require higher voltage switches for the converter, 31, connected to inputs U1, U2, U3.

Figure 12A:
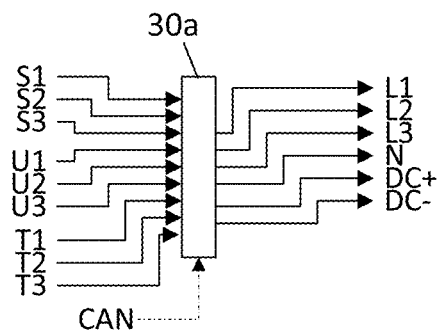
FIG. 12A illustrates an example pin diagram for an integrated circuit for the segmented waveform converter of FIG. 10.

FIG. 12A illustrates an example pin diagram for a circuit package or integrated circuit for a network of segmented waveform converters 30a. The inputs to network 30a, which are S1, S2, S3, U1, U2, U3, T1, T2, and T3, are on one side of the circuit package, and the line outputs L1, L2, and L3, neutral line N, and field current outputs DC+, DC− are on the other side of the circuit package. The controller area network (CAN) provides a control input to the circuit package in order to set the output. The control input may be the bitwise switch settings describe above (e.g., {SW1, SW2, SW3, SW4, SW5, SW6}) or the control input may be a target output, and the switch settings are controlled internal to the circuit package.

Figure 12B:
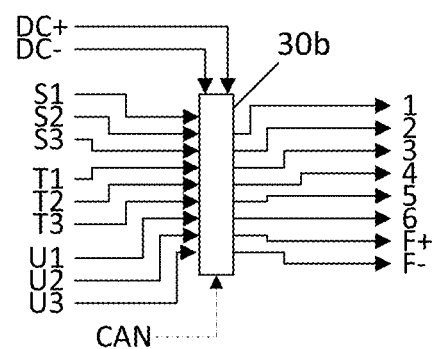
FIG. 12B illustrates an example pin diagram for an integrated circuit for the segmented waveform converter of FIG. 11.

FIG. 12B illustrates an example pin diagram for a similar circuit package or integrated circuit for the network of segmented waveform converters 30b. The inputs to network 30b, which are S1, S2, S3, U1, U2, U3, T1, T2, and T3, are on one side of the circuit package, and the differential outputs 1, 2, 3, 4, 5, and 6, and field current outputs F+, F− are on the other side of the circuit package. As described above the CAN control input to the circuit package sets the output with either bitwise switch settings or a target output level.

Figure 13:
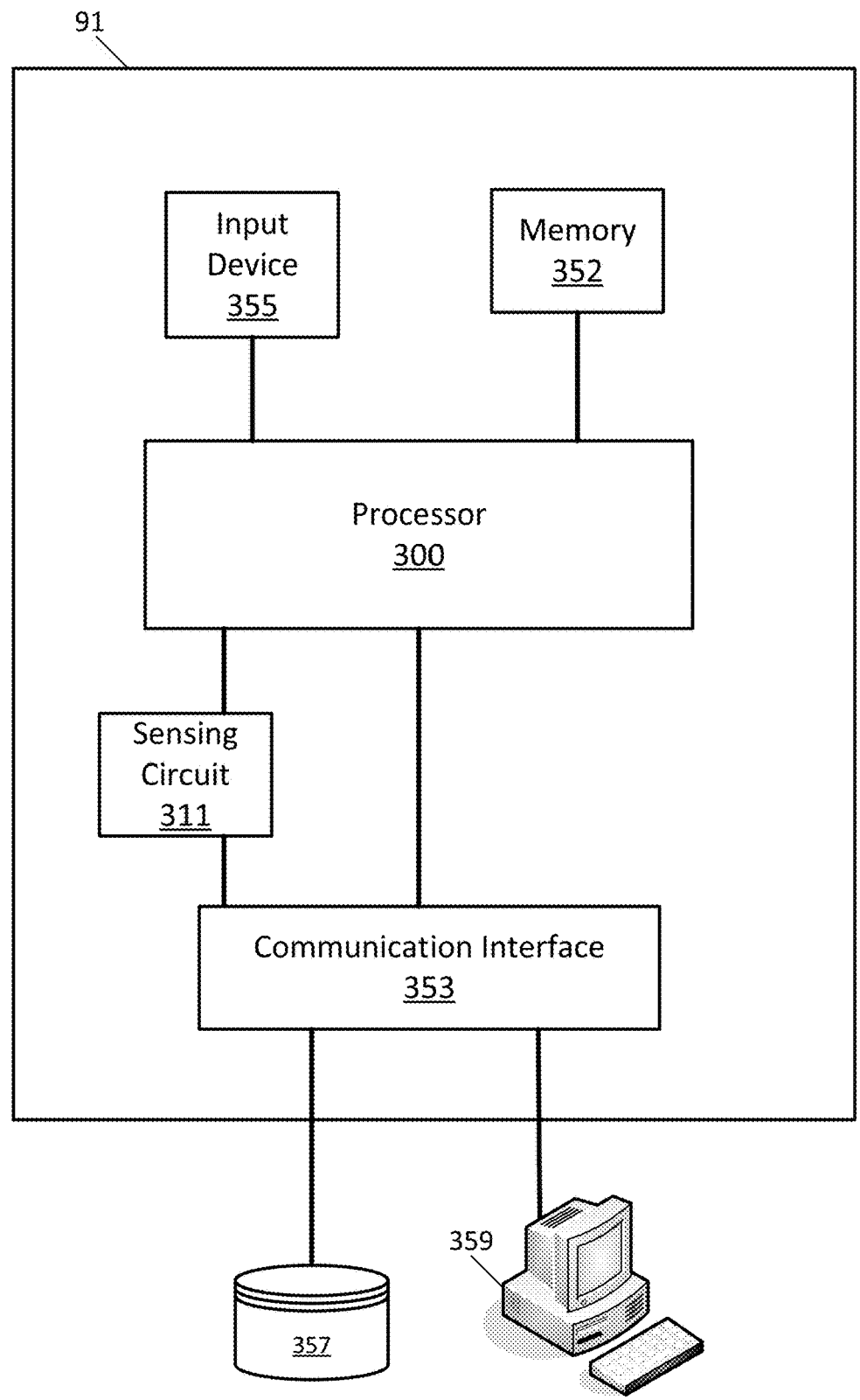
FIG. 13 illustrates an example controller.
Figure 14:
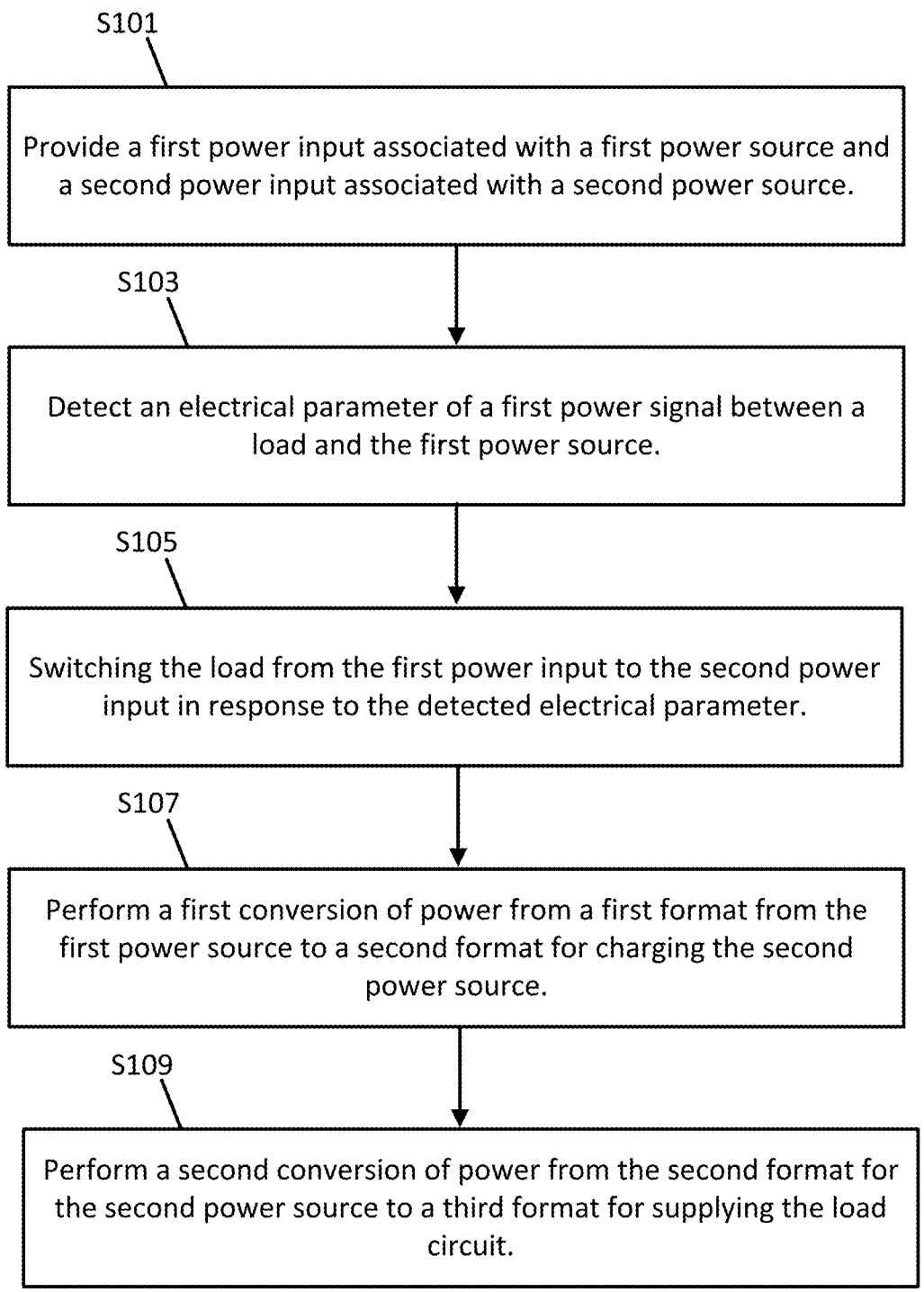
FIG. 14 illustrates a flow chart for the controller of FIG. 13.

FIG. 13 illustrates an example conversion device controller 91. The controller 91 may include a processor 300, a memory 352, and a communication interface 353. The controller 91 may be connected to a workstation 359 or another external device (e.g., control panel) and/or a database 357 for receiving user inputs, system characteristics, and any of the values described herein. Optionally, the generator controller 91 may include an input device 355 and/or a sensing circuit 311. The sensing circuit 311 receives sensor measurements from as described above. Additional, different, or fewer components may be included. The processor 300 is configured to perform instructions stored in memory 352 for executing the algorithms described herein. The processor 300 may be compatible with a variety of engine and alternator combination and may identify an engine type, make, or model, and may look up system characteristics, settings, or profiles based on the identified engine type, make, or model in setting thresholds for the sensor 20 or feedback from the battery 14 or generator 13 or a schedule for transitions for changing modes of operation. FIG. 14 illustrates a flow chart for the operation of the generator controller of FIG. 13. Additional, different of fewer acts may be included.

At act S101, controller 91 (e.g., through input device 355) provides a first power input associated with a first power source and a second power input associated with a second power source. The power inputs may be provided by completing a conductive connection with the power sources. The electrical connections in the input device 355 or the input device 355 may be a means for providing a first power input associated with a first power source and a second power input associated with a second power source.

At act S103, the processor 300 accesses from memory 352 or from real time measurement a measured electrical quantity for a power signal between the load circuit and the first power source. The measured electrical quantity may be measured by sensing circuit 311, an external sensor (e.g., sensor 20), or internally determined based on a connection with the first power source and the second power source (e.g., the status of the utility may be measured from the power input connected to the load or connected to the utility). The sensing circuit 311 is a means for detecting an electrical parameter of the first power circuit between the load circuit and the first power source.

At act S105, the processor 300 generates commands to switch the load circuit from the first power input to the second power input in response to the detected electrical parameter. For example, the commands may instruct a switch to disconnect the load circuit from the first power input and instruct the matrix of switches to connect second power input to the load circuit. The processor 300 or a switch (e.g., switch 11, the combined converter and switch 16, the bidirectional current conversion device 92, or the combined switch and bidirectional converter 96) is a means for switching the load circuit from the first power input to the second power input in response to the detected electrical parameter.

At act S107, the processor 300 generates settings for controlling the matrix of switches to perform a first conversion of power from a first format from the first power source to a second format for charging the second power source. At act S109, the processor 300 generates settings for controlling the matrix of switches to perform a second conversion of power from the second format for the second power source to a third format for supplying the load circuit. The processor 300 compare a target value for the second format to available inputs. One set of available inverter inputs is shown on each row of Table 2 above. The available inverter inputs depend on either the expected or actual values of outputs of the alternator. For example, in a three phase alternator having outputs A, B, and C, the set of outputs may be A, B, C, A−B, B−C, A−C, B−A, C−B, and C−A. Each of the set of outputs has a value, which changes on each time interval (e.g., sampling interval). The processor 300 is a means for controlling switch settings to perform a first conversion of power from a first format from the first power source to a second format for charging the second power source a means for controlling switch settings for controlling the matrix of switches to perform a second conversion of power from the second format for the second power source to a third format for supplying the load circuit The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 353 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352 or database 357) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

We claim:

1. An apparatus comprising:
a first power input associated with a first power source;
a second power input associated with a second power source;
a third power input associated with a third power source;
a synchronous inverter configured to perform a first conversion of power from a first format from the first power source to a second format for charging the second power source and perform a second conversion of power from the second format for the second power source to a third format for supplying a load, wherein current flows through the synchronous inverter in a first direction for the first conversion of power and current flows through the synchronous inverter in a second direction for the second conversion of power, wherein the synchronous inverter is configured to perform a third conversion of power from a fourth format from the third power source to the second format for charging the second power source, wherein the synchronous inverter is configured to perform a fourth conversion of power from the fourth format from the third power source to the third format for supplying the load,
wherein the synchronous inverter includes a plurality of waveform converters including at least one energy storing element; and
a bypass path configured to bypass the synchronous inverter and provide power from the first power source to the load without performing the first conversion of power, wherein the bypass path is activated in a bypass mode in response to a power signal from the first power source.

2. The apparatus of claim 1, further comprising:
a sensor input coupled to a sensor configured to generate a signal indicative of operation of the first power source, wherein the synchronous inverter is configured to select the first conversion or the second conversion in response to the signal indicative of operation of the first power source.

3. The apparatus of claim 2, wherein the signal indicative of the operation is a status signal for a transfer switch or the signal indicative of the operation is a power signal for the load.

4. The apparatus of claim 1, further comprising:
a memory including at least one time threshold, wherein the synchronous inverter is configured to perform a comparison of time elapsed since the signal indicative of operation of the first power source to the at least one time threshold and select the first conversion of power or the second conversion of power in response to the comparison.

5. The apparatus of claim 1, wherein the synchronous inverter includes a plurality of internal switches configurable in a first combination to convert power from the first format from the first power source to the second format for charging the second power source and a second combination to convert power from the second format for the second power source to the third format for supplying the load.

6. The apparatus of claim 1, wherein the first power source is a utility grid, the second power source is an energy storage device, and the third power source is a generator.

7. The apparatus of claim 6, wherein the energy storage device is configured to start the generator in addition to supplying the load.

8. The apparatus of claim 1, wherein the first power source is a utility grid, and the second power source is an energy storage device.

9. The apparatus of claim 1, wherein a transition for the load from the first power source to the second power source occurs in less than a predetermined time value.

10. An apparatus comprising:
a first power input associated with a first power source;
a second power input associated with a second power source;
a third power input associated with a third power source including a generator; and
a synchronous inverter configured to perform a first conversion of power for supplying a load and a second conversion of power for supplying a load, wherein current flows through the synchronous inverter in a first direction for the first conversion of power and current flows through the synchronous inverter in a second direction for the second conversion of power, wherein the synchronous inverter is configured to perform a comparison of time elapsed since a signal indicative of operation of the first power source to at least one time threshold for the generator and select the first conversion of power or the second conversion of power in response to the comparison,
wherein the synchronous inverter includes a plurality of waveform converters including at least one energy storing element, and
a bypass path configured to bypass the synchronous inverter and provide power from the first power source to the load without performing the first conversion of power, wherein the bypass path is activated in a bypass mode in response to a power signal from the first power source.

11. The apparatus of claim 10, wherein the first conversion of power or the second conversion of power is delayed to reduce wear on the third power source.

12. The apparatus of claim 10, further comprising circuitry configured to perform a third conversion of power for charging the second power source.

13. The apparatus of claim 10, wherein at least a portion of the bypass path is internal to the synchronous inverter.

14. The apparatus of claim 1, wherein at least a portion of the bypass path is internal to the synchronous inverter.

* * * * *